3,462,965
FAN SPEED CONTROL FOR REFRIGERATION SYSTEM
Robert G. Miner, La Crosse, Wis., assignor to The Trane Company, La Crosse, Wis., a corporation of Wisconsin
Filed Aug. 19, 1968, Ser. No. 753,546
Int. Cl. F25b 27/00; F25d 31/00
U.S. Cl. 62—180
6 Claims

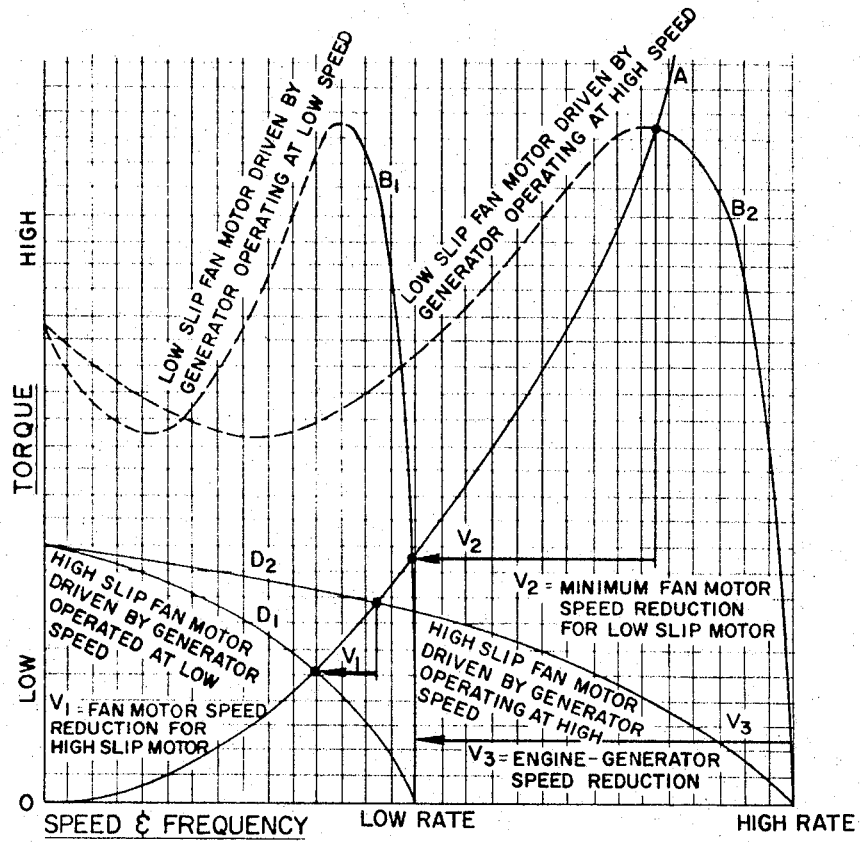
FIG. 2
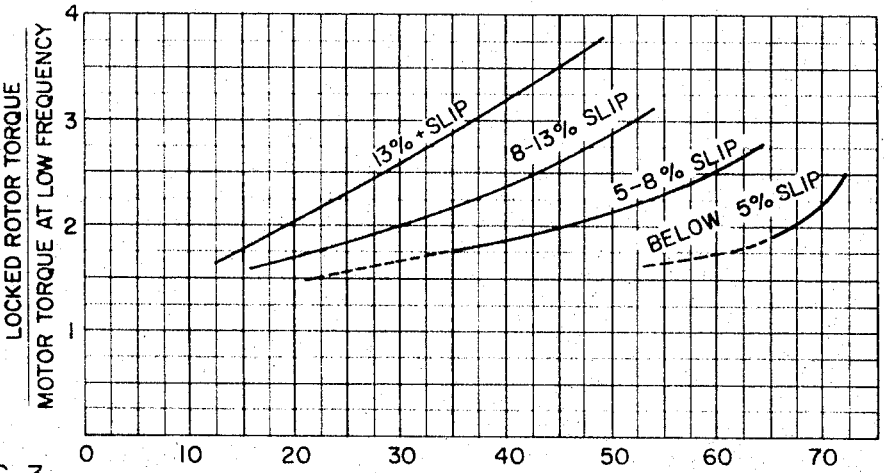
FIG. 3 FAN MOTOR SPEED REDUCTION AS A PERCENT OF ENGINE SPEED REDUCTION FOR 50% ENGINE SPEED REDUCTION
INVENTOR.
ROBERT G. MINER
BY Carl M. Lewis
ATTORNEY United States Patent Office 3,462,965
Patented Aug. 26, 1969

ABSTRACT OF THE DISCLOSURE

A refrigeration system is powered by an internal combustion engine. The capacity of the refrigeration system is varied by varying the speed of the engine. The evaporator fan of the refrigeration system is driven by an alternating current motor which derives its power from an alternating current generator driven by the engine. The frequency and voltage of the alternating current varies directly with the speed of the engine and generator. The evaporator fan motor is of the high slip class whereby it maintains relatively uniform speed despite the relatively large variations in the speed of the engine and generator.

Background of the invention

This invention relates to air conditioning systems and more specifically to control means therefor.

This invention has particular utility in transport air conditioning systems used in the transportation of goods which must be maintained at controlled temperatures such as frozen foods and produce. Such systems employ refrigeration apparatus having the usual refrigerant compressor, condenser, and evaporator serially connected. A fan is generally employed to circulate the air within the conditioned space and in heat exchange relation with the refrigeration system.

Generally, a prime mover such as an internal combustion engine with an electric generator is employed to drive the compressor and fan, and the electrical heaters if used.

Of course, the thermal load on the air conditioning system will vary from time to time depending upon several factors including variations in ambient temperatures. It therefore is necessary to control the capacity of such conditioning systems.

One successful method of control has been to vary the speed of the prime mover. It is practical to use a continuously running prime mover which is operated at different speeds to obtain capacity control of the refrigeration system. A two-speed control cycle is most frequently employed, however the instant invention is equally applicable to a system wherein the speed is infinitely variable. In addition to obtaining a satisfactory capacity control, such continuously operating systems have the inherent advantage of fewer failures due to engine starting difficulties.

The disadvantage that has accompanied refrigeration systems employing speed control has been the existence of substantial temperature variations within the conditioned space. These variations present themselves as hot or cold spots in the conditioned space which can be particularly detrimental to frozen goods that thaw or chilled produce which freezes.

To eliminate this disadvantage, it has been suggested in my U.S. Patent 3,276,220 that a two-speed variable torque reconnected single winding induction motor be used to drive the evaporator fan. When the engine and alternating current generator are operated at high speed, the motor would be connected to a certain number of poles. When the engine and generator are operated at low speed, the fan motor is reconnected to present fewer poles and thus operated at a generally uniform speed despite the variations in engine and generator speed. The system requires substantial switching apparatus for reconnecting the motor and is not readily adaptable for infinitely variable speed control.

Summary of the invention

The instant invention eliminates the reconnecting switch apparatus and can easily be used with a prime mover which operates at an infinite number of speeds.

The instant invention thus provides a simpler and more reliable means for maintaining the evaporator fan speed relatively uniform despite large variations in the prime mover speed for purposes of varying capacity of the refrigeration system.

These objectives are achieved by the combination of a high slip squirrel-cage induction motor with the evaporator fan which will operate the evaporator fan at relatively uniform speed despite the large variations in the alternating current frequency and voltage supplied thereto.

This invention specifically involves an air conditioning system for conditioning a space comprising: a mechanical refrigeration system including; a first heat exchanger, a refrigerant throttling means, a second heat exchanger, and a refrigerant compressor respectively serially connected in a closed refrigerant circuit; fan means for passing air in heat exchange relation with said second heat exchanger and circulating said air in said conditioned space; a high slip squirrel-cage induction fan motor drivingly connected to said fan means; a prime mover; means for drivingly connecting said prime mover to said compressor and said high slip squirrel-cage induction fan motor; said last named means including an electric alternating current generator drivingly connected to said prime mover; means for varying the capacity of said compressor and thus said air conditioning system by varying the speed of said prime mover and thus said compressor and generator between a relatively high first rate and a relatively low second rate thereby varying the generator current frequency between a relatively high first rate and a relatively low second rate; an electric power circuit means serially connecting said generator to said high slip squirrel-cage induction fan motor whereby the frequency of the alternating current supplied to said motor is varied between a relatively high rate and a relatively low rate; said high slip squirrel-cage induction fan motor having characteristic slip in excess of 5% when operated at said relatively low frequency rate whereby the slip greatly increases when supplied with current at said relatively high frequency rate to thereby operate said high slip squirrel-cage induction fan motor and thus said fan means at relatively uniform speed despite the variation in speed of said prime mover.

Other objects and advantages will become apparent as this specification proceeds to describe the invention in detail with reference to the accompanying drawing in which:

FIGURE 2 is a graph on which the ordinate represents evaporator fan and motor torque and the abscissa represents motor, generator, and fan speed. Both high slip and low slip fan motor curves are shown for frequencies corresponding to both high and low generator speeds wherein the low generator speed has been selected at fifty percent of high generator speed.

FIGURE 3 is a graph on which the ordinate represents the ratio of the evaporator fan motor locked rotor torque to the evaporator fan motor torque at the low generator speed and the abscissa represents the evaporator fan motor speed reduction as a percent of engine speed reduction for a fifty percent generator speed reduction. Curves for evaporator fan motors of different slip are illustrated.

Figure 1:
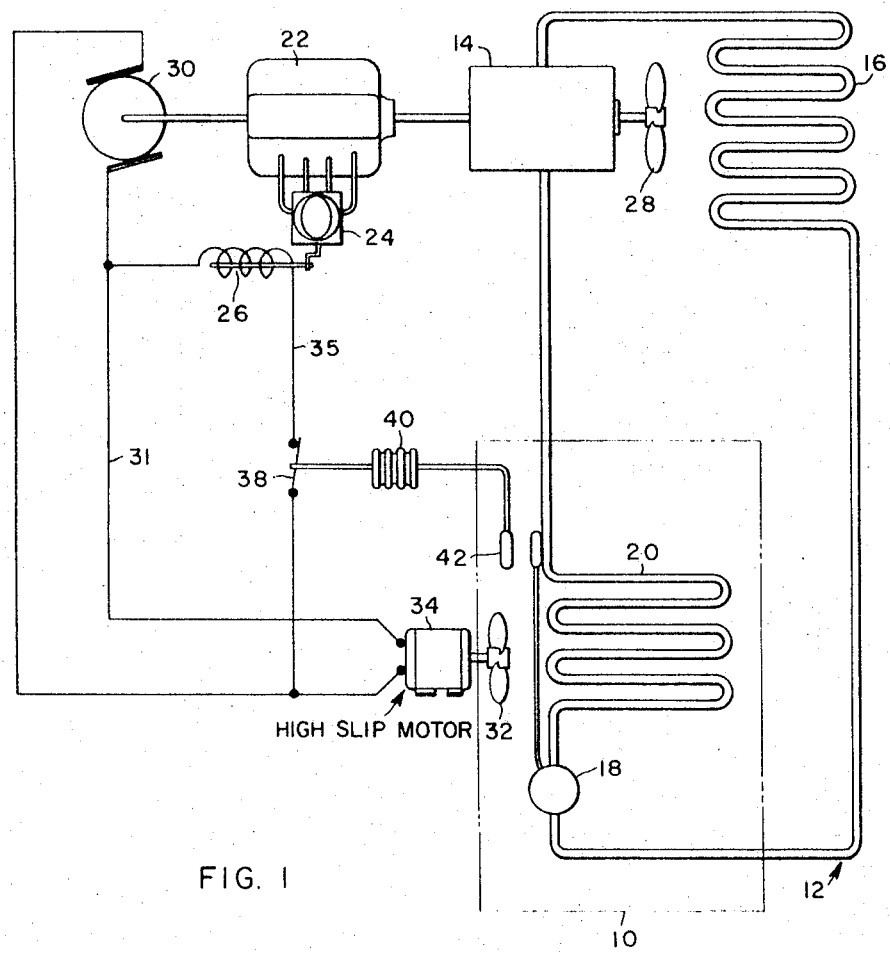
FIGURE 1 is a schematic of an air conditioning system embodying the instant invention.

Now referring to FIGURE 1 it will be seen that an air conditioned space 10, which may be the cargo space of a railway refrigeration car or refrigeration truck, is provided with a refrigeration system generally designated by numeral 12. While refrigeration system 12 may be of the reversible heat pump type, for purposes of illustrating the invention it has been shown as for cooling only. The refrigeration system includes a refrigerant compressor 14, a refrigerant condenser heat exchanger 16, a refrigerant throttling means such as for example temperature responsive expansion valve 18, and evaporator heat exchanger 20 respectively serially connected in a closed refrigerant loop.

The refrigeration system 12 is powered by an internal combustion engine 22 having a fuel control such as carburetor 24 which is controlled by solenoid 26.

Engine 22 is drivingly connected to compressor 14. A fan 28 for passing cooling air over condenser 16 is shown as being driven by engine 22. Engine 22 is also drivingly connected to an alternating current generator 30. It will be appreciated that engine 22 and thus generator 30, compressor 14 and condenser fan 28 operate at a relatively low rate when solenoid 26 is de-energized and at a relatively high rate when solenoid 26 is energized by closure of switch 38 hereinafter described.

Evaporator fan 32 is arranged to circulate the air of the conditioned space 10 over evaporator coil 20 for purposes of uniformly cooling space 10. Fan 32 is driven by high slip alternating current electric squirrel-cage induction motor 34. A power circuit 31 serially connects generator 30 to motor 34 whereby motor 34 is driven by generator 30.

An engine control circuit 35 serially connects generator 30, solenoid 26, and thermostatic switch 38. Switch 38 is actuated by bellows 40 which is connected to a temperature sensing bulb 42 disposed to sense the temperature of the conditioned space 10.

It should be appreciated that when a continuously variable engine speed control is used, a potentiometer may be substituted for switch 38 and a modulated linear actuator may be substituted for solenoid 26.

During operation of the system engine 22, generator 30, compressor 14, and fans 28 and 32 are operating. Refrigerant is compressed by compressor 14 and delivered to condenser 16 where the cooling air circulated over the condenser 16 by fan 28 condenses the refrigerant gas to a liquid. The liquid refrigerant then flows to expansion valve 18 where it is throttled to a lower pressure into evaporator 20. Heat absorbed from the conditioned space 10 evaporates the refrigerant which is then returned to compressor 14 for recirculation. The operation of the refrigerant circuit, whether at high or low speed, is similar except that at the high speed the refrigerant circulates at a higher rate and a greater quantity of heat is absorbed at the evaporator 20 and rejected at the condenser 16.

The speed of engine 22 is controlled by temperature responsive bulb 42 in the following manner. When the temperature in space 10 is low, bulb 42 causes bellows 40 to contract thereby opening switch 38 to maintain solenoid 26 in the de-energized or low speed position. Under this condition of operation generator 30 is driven at a relatively low speed to supply current to evaporator fan motor 34 at a relatively low frequency and voltage. Should the heat gain in space 10 exceed the heat removed by evaporator 20 during this low speed operation of the system, the temperature in space 10 will rise until it reaches a predetermined value causing the fluid in bulb 42 to expand bellows 40 thereby closing switch 38. Upon closure of switch 38, a control circuit 35 is made serially connecting generator 30, switch 38 and solenoid 26 thereby energizing solenoid 26 and actuating fuel control 24 to the high speed position. The engine thus increases its speed to the relatively high rate, driving generator 30, compressor 14 and fan 28 at a relatively high speed. Generator 30 then supplies motor 34 with a current of substantially higher voltage and frequency.

If the system illustrated in FIGURE 1 were to employ a conventional type evaporator fan motor such as NEMA (National Electrical Manufacturer's Association) design B, the variation in speed of fan 32 would closely approximate the speed variation of engine 22 as such motors can only be operated with a few percent slip whether the current frequency be high or low, without causing excessive motor current and eventually motor burnout.

As described in my aforementioned patent, such variations in evaporator fan speed are particularly undesirable as they permit uneven temperatures to develop in the conditioned space when the system is operated at the low rate. If a conventional fan motor is selected to produce sufficient circulation in the conditioned space when the system is operated at the low rate, then the fan driven by a conventional fan motor will become noisy and require excessive power when the system is operated at the high rate because of excessive speed.

To solve the aforementioned fan speed control problem, I have provided fan 32 with a squirrel-cage induction fan motor 34 of the high slip type, i.e. one having high slip characteristics. The manner in which these high slip characteristics are incorporated into the motor are well known to the motor art and require no further explanation for purposes of understanding the instant invention. Motor 34 has in excess of 5% slip at its rated load and is sized to provide just enough power to operate fan 32 at the desired speed when the motor is operating with the relatively low voltage and frequency. When the speed of engine 22 is increased to the high rate, generator 30 supplies motor 34 with high voltage and high frequency current.

Because of the relationship between the fan torque and speed and the high slip motor torque and speed, only a relatively small increase in fan speed results from the increase in frequency and voltage. These relationships are illustrated in FIGURE 2. Curve A represents the torque-speed relation for fan 32. Curves $B_1$ and $B_2$ represent the torque-speed relations for a NEMA type B motor (a conventional fan motor) for the low and high frequency supply current conditions, respectively. Curves $D_1$ and $D_2$ represent the torque-speed relations for a NEMA type D motor with above 13% slip for the low and high frequency supply current conditions, respectively. The low frequency or engine speed was selected at one-half the high frequency or engine speed. This variation is represented by vector $V_3$. The intersections of these curves $B_1$, $B_2$, $D_1$ and $D_2$ with the fan curve A indicate the respective speeds at which the fan will be driven by the low and high slip motors for the low and high frequency conditions. Note that the fan speed variation associated with the high slip motor as represented by vector $V_1$ is considerably less than the fan speed variation associated with the NEMA type B motor as represented by $V_2$ for the same current frequency reduction as represented by $V_3$.

Both the NEMA B and D type motors represented by the motor torque-speed curves have a starting torque of about two times their torque during low frequency current operation. The size of the B type motor represented by the curves $B_1$ and $B_2$ was selected for minimum fan speed variation rather than practical considerations. In actual practice the B type motor would have to be much larger than the one illustrtaed as the slip at the high frequency is excessive for this type of motor which would result in excessive motor current and motor heating. The larger motor would increase the fan speed variation. If a smaller NEMA type B motor were used curve A would intersect curve $B_2$ to the left of the apogee of curve $B_2$. It is well known that operation at this portion of the curve is unstable and results in excessively high motor currents with resulting motor failure. The completely impractical operating portions of these motor curves both in FIGURE 2 and FIGURE 3 have been shown in dashed line.

The fan speed variations, such as $V_1$ and $V_2$, as a percentage of the engine speed variation accompanying a 50% engine speed reduction are graphically illustrated in FIGURE 3 for motors of various slips and sizes. The size of the motor is expressed as the ratio of locked rotor torque divided by the motor torque at the low operating frequency accompanying a fifty percent engine speed reduction.

For purposes of uniform fan speed control in accordance with this invention, the ideal fan motor is one represented in the graph of FIGURE 3 by a point way to the left at the 0% margin. It will be seen that only those curves representing motors of at least 5% slip and preferably above 8% slip extend into a range where the motor speed variation is less than 50% of the engine or generator speed variation. It also will be seen that only motors with a low ratio of locked rotor torque to low frequency running torque should be used to obtain the desired fan speed control. In this connection the motor should have a starting torque between 1 and about 2.5 times the torque when operating the fan at the low speed. It can be seen that somewhat larger motors (motor with starting torques about 2.5 times the low speed running torque) will be useful for motors above 8% slip. As aforementioned, the graph of FIGURE 3 is based upon an engine speed reduction of 50%. An increase in the engine speed variation generally increases the percentage fan speed variation while a reduction in engine speed variation generally reduces the percentage fan speed variation.

Having now described the preferred embodiment of my invention, I contemplate that many changes may be made without departing from the scope or spirit of my invention and I accordingly desire to be limited only by the claims.

I claim:
1. An air conditioning system for conditioning a space comprising: a mechanical refrigeration system including; a first heat exchanger, a refrigerant throttling means, a second heat exchanger, and a refrigerant compressor respectively serially connected in a closed refrigerant circuit; fan means for passing air in heat exchange relation with said second heat exchanger and circulating said air in said conditioned space; a high slip squirrel-cage induction fan motor drivingly connected to said fan means; a prime mover; means for drivingly connecting said prime mover to said compressor and said high slip squirrel-cage induction fan motor; said last named means including an electric alternating current generator drivingly connected to said prime mover; means for varying the capacity of said compressor and thus said air conditioning system by varying the speed of said prime mover and thus said compressor and generator between a relatively high first rate and a relatively low second rate thereby varying the generator current frequency between a relatively high first rate and a relatively low second rate; an electric power circuit means serially connecting said generator to said high slip squirrel-cage induction fan motor whereby the frequency of the alternating current supplied to said motor is varied between a relatively high rate and a relatively low rate; said high slip squirrel-cage induction fan motor having a characteristic slip in excess of 5% when operated at said relatively low frequency rate whereby the slip greatly increases when supplied with current at said relatively high frequency rate to thereby operate said high slip squirrel-cage induction fan motor and thus said fan means at relatively uniform speed despite the variation in speed of said prime mover.

2. The apparatus as defined by claim 1 wherein said high slip squirrel-cage induction fan motor has a characteristic slip in excess of 8% when operated at said relatively low frequency rate.

3. The apparatus as defined by claim 1 wherein said high slip squirrel-cage induction fan motor has a characteristic slip in excess of 13% when operated at said relatively low frequency rate.

4. The apparatus as defined by claim 1 wherein said high slip squirrel-cage induction fan motor has a characteristic speed and torque relationship in which the torque progressively increases throughout a motor speed change from synchronous speed to the speed of said motor operating said fan means at said relatively high frequency rate.

5. The apparatus as defined in claim 1 wherein said high slip squirrel-cage induction fan motor has a characteristic speed and torque relationship in which the torque progressively increases throughout a motor speed change from synchronous speed to a locked rotor condition.

6. The apparatus as defined by claims 1, 2, 3, 4 or 5 wherein said high slip squirrel-cage induction fan motor has a ratio of locked rotor torque to torque when operating said fan means at said low frequency rate equal to less than about 2½.

References Cited

UNITED STATES PATENTS

| 3,152,455 | 10/1964 | Ware | 62—180 XR |
| 3,214,931 | 11/1965 | Petranek | 62—228 XR |

MEYER PERLIN, Primary Examiner

U.S. Cl. X.R.

62—227, 229, 323